April 6, 1965     J. C. CRATES     3,176,944
UNIVERSAL DROP WIRE CLAMP
Filed March 10, 1964
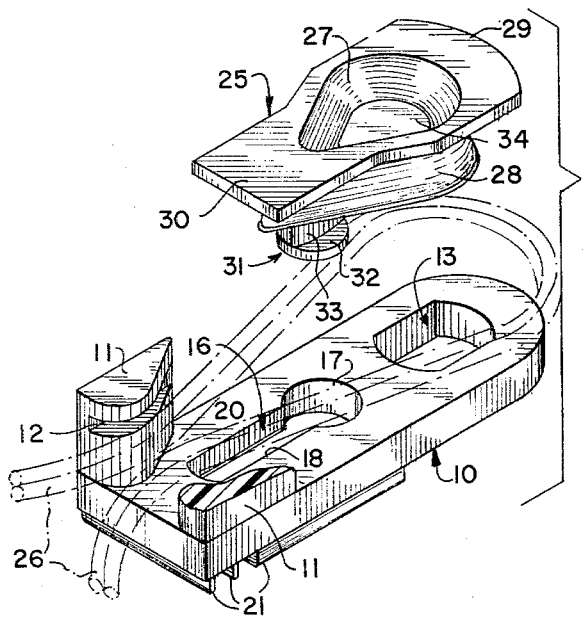
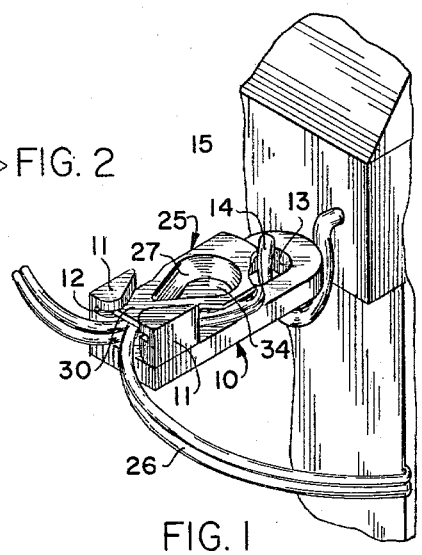
FIG. 2
FIG. 1
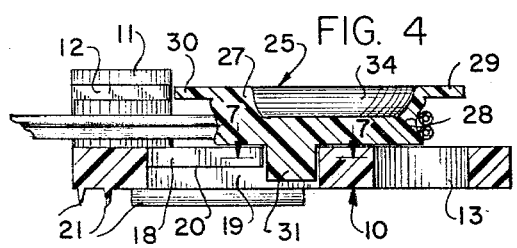
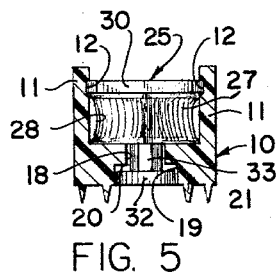
FIG. 4
FIG. 5
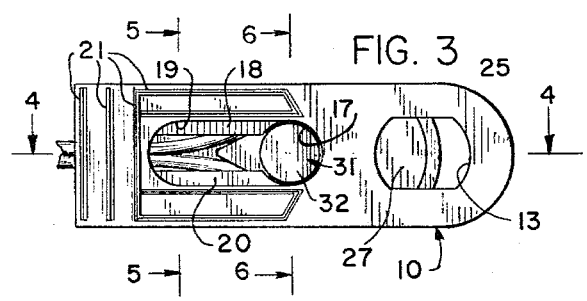
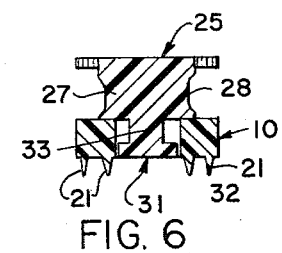
FIG. 3
FIG. 6
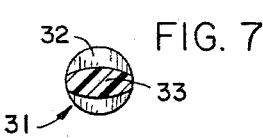
FIG. 7
INVENTOR
JAMES C. CRATES
BY
ATTORNEY

United States Patent Office 3,176,944
Patented Apr. 6, 1965

3,176,944
UNIVERSAL DROP WIRE CLAMP
James C. Crates, Charlotte, N.C., assignor to Jameson Corporation, Charlotte, N.C.
Filed Mar. 10, 1964, Ser. No. 350,824
5 Claims. (Cl. 248—62)

This invention relates to devices employed in connection with cables of one or more strands of metal or other substance and with or without a sheath or covering, and of the character utilized in various transmissions including electricity, telephonic messages and the like.

The invention relates specifically to a drop wire clamp for securing a telephone or other drop wire at a house, pole, cable, or other location, and designed to utilize the tension produced by the suspension of the wire to provide a locking action to clamp the wire and to maintain it in position.

Installation of wire cables and the securing of electrical and telephonic drop wires has required considerable care, time, labor, skill, and special tools and equipment including multiple fixtures and has resulted in harm to the user or to the wire. Also it has been necessary at times to reinforce the drop wire, and although substantial care has been exercised, short circuits have resulted from the wire being hit by lightning.

It is an object of the invention to provide a drop wire clamp of simple and inexpensive construction, by which a positive solid installation may be easily provided utilizing the tension resulting from the weight of the wire to produce a locking action or reinforcing of the wire and with a substantial saving in installation time as well as a neater job at a lower cost, and an installation which will not result in harm to the user or to the wire, including short circuits when lightning strikes.

Another object of the invention is to provide a drop wire clamp which will remove the drop suspension from the poles, clear the climbing space, square off the drop wire entrance, and promote a safe, neat, efficient installation.

A further object of the invention is to provide a drop wire clamp which may be used, in combination with other equipment, as a drop wire support system, more economically and safely, as well as one which may be installed without the need of special tools and which clamp may be repeatedly reused.

Other objects and advantages of the invention will be apparent from the following description taken in conjunction with the accompanying drawing in which:

FIG. 1 is a perspective illustrating one application of the invention;

FIG. 2, an enlarged exploded perspective of a drop wire support clamp;

FIG. 3, a bottom plan view of the clamp partially assembled;

FIG. 4, a vertical section on the line 4—4 of FIG. 3;

FIG. 5, a transverse section taken along the line 5—5 of FIG. 3;

FIG. 6, a transverse section taken along the line 6—6 of FIG. 3; and,

FIG. 7, a section taken along the line 7—7 of FIG. 4.

Briefly stated, the present invention is a relatively strong positive acting drop wire supporting clamp which may be attached to a mounting structure to support a drop wire of a telephone line or electrical service line. The clamp may be attached to a pole or messenger cable to support one end of a drop wire and prevent strain on the connection. At the opposite end of the drop wire, the clamp may be mounted on a building or other structure to prevent strain on a lead-in wire. The clamp includes a base with a drop wire locking member slidable relative thereto and adapted to receive a bight portion of a drop wire and to lock such drop wire so that the clamp supports the weight thereof.

With continued reference to the drawing, a drop wire support clamp is provided comprising a relatively long base 10 preferably constructed of relatively strong moldable material. A pair of upstanding projections or ears 11, having generally flat outer surfaces and convex inner surfaces in opposed relation to each other, are molded on one end of the base 10 and extend from one side thereof in generally parallel relation. Each of the ears 11 is provided with a groove 12 adjacent to its free end and disposed on the inner side thereof in opposed relation for a purpose which will be described later.

The base 10 has an opening 13 therethrough adjacent to the end opposite the ears 11 for the reception of any desired attaching means as for example a hook 14 carried by a supporting structure 15 including a pole, building or the like. The base also has a keyhole slot 16 including a generally circular opening 17 and a communicating slot 18 located between the opening 13 and the ears 11. The slot 18 extends partially through the base 10 and communicates with a recess 19 forming shoulders 20. If desired, the base may be reinforced by ridges 21 projecting downwardly therefrom.

A locking member 25 is provided for cooperatively engaging the base 10 and securing a drop wire 26 therebetween. The locking member 25 includes a body 27 which is generally circular at one end and tapered to a point at the opposite end. The side walls 28 of the body 27 are generally concave in cross-section and are adapted to receive the drop wire 26. The body 27 has a flange 29 on its upper surface and such flange has a reduced portion 30 extending over and beyond the tapered end of the body and such reduced portion has generally parallel sides which are received within the groove 12 of the ears 11 to prevent rotation of the body relative to the base 10.

A key 31 extends downwardly from the lower surface of the body 27 and includes a disk 32 of a diameter slightly less than the circular opening 17 in the base and such disk is connected to the body by a reduced generally oval post or connecting member 33. In order to facilitate the assembly and disassembly of the locking member 25 with the base 10, the body 27 has a recess 34 in its upper surface to provide a gripping area for the reception of the thumb or finger of the operator.

In the operation of the device, a bight or loop is formed in the drop wire 26 and is passed around from the rear of the body 27 and is received within the concave side walls 28. The key 31 is then inserted through the circular opening 17 of the base 10 and thereafter the locking member 25 is moved towards the end of the base 10 so that the reduced portion 30 of the flange 29 is received within grooves 12 of the ears 11. The drop wire is disposed between the ears 11 and as the locking member 25 is moved toward such end the wire will be pressed between the body 27 and the convex inner surfaces of the ears 11. Simultaneously the connecting member 33 will be received within the communicating slot 18 and the disk 32 will be received within the recess 19 in such a manner that the shoulders 20 will be disposed above the disk and will prevent vertical movement of the locking member 25. The base 10 is then connected to a supporting structure by placing the opening 13 over the open end of the hook 14 carried thereby.

It will be apparent that a drop wire support clamp is provided which will support the full weight of the drop wire and relieve any strain on the wire connection. The structure is such that the more weight that is applied to the clamp the tighter the locking member 25 will compress the wire against the ears 11.

It will be obvious to one skilled in the art that various changes may be made in the invention without departing

What is claimed is:

1. A drop wire support clamp comprising a base, a pair of upstanding ears on said base having convex inner surfaces, said ears having grooves adjacent one of the ends thereof, means for attaching said clamp to a supporting structure, a keyhole slot in said base, a wire locking member removably mounted on said base, said member including a body having generally concave side walls, a flange on said member, a portion of said flange being receivable within said grooves, a key mounted on said locking member and being engageable with said keyhole slot, said locking member being attachable to said base in a position remote from said ears and movable toward said ears so that said body is in proximity to said ears, whereby a drop wire can be placed about said body and the body moved toward said ears to bind the wire therebetween.

2. A clamp for supporting a drop wire comprising a base, a pair of spaced generally parallel ears mounted on said base, said base having slot means disposed generally along the longitudinal centerline, a wire locking member removably mounted on said base, means on said locking member receivable within said slot means for slidably locking said base and said locking member in assembled relation, wire engaging means on said locking member, a drop wire disposed between the ears of said base and about the wire engaging means of said locking member, whereby said locking member can be moved longitudinally of said base to secure said wire between said wire engaging means and said ears.

3. The structure of claim 2 in which said ears have inner and outer sides with grooves on the inner sides facing each other, and said locking member has a flange receivable within said grooves.

4. The structure of claim 3 in which said inner sides are generally of concave configuration.

5. The structure of claim 2 including means for connecting said base to a supporting structure.

No References Cited.

CLAUDE A. LE ROY, *Primary Examiner.*